United States Patent [19]

Spoel

[11] Patent Number: 5,688,470
[45] Date of Patent: Nov. 18, 1997

[54] APPARATUS FOR RECOVERY OF NON-FERROUS METALS FROM SCRAP AND DROSS

[76] Inventor: Han Spoel, 210 MacPherson Avenue, Toronto, Ontario, Canada, M5R 1W8

[21] Appl. No.: 700,044

[22] Filed: Aug. 20, 1996

Related U.S. Application Data

[60] Continuation of Ser. No. 470,005, Jun. 6, 1995, abandoned, which is a division of Ser. No. 201,335, Feb. 24, 1994, Pat. No. 5,540,752.

[30] Foreign Application Priority Data

Feb. 2, 1994 [CA] Canada ................. 2116249

[51] Int. Cl.$^6$ ................................. C21D 11/00
[52] U.S. Cl. ................... 266/87; 266/207; 266/213; 266/244
[58] Field of Search ................ 266/81, 207, 87, 266/208, 213, 244, 901, 225

[56] References Cited

U.S. PATENT DOCUMENTS

| | | | |
|---|---|---|---|
| 792,642 | 6/1905 | Williams | 266/244 |
| 4,952,237 | 8/1990 | Dube et al. | |
| 4,959,100 | 9/1990 | Dube et al. | |
| 4,960,460 | 10/1990 | Dube et al. | |
| 4,997,476 | 3/1991 | Lindsay et al. | |
| 5,030,273 | 7/1991 | Lindsay et al. | |
| 5,421,850 | 6/1995 | Dube et al. | 266/213 |

FOREIGN PATENT DOCUMENTS

| | | |
|---|---|---|
| 63-057731 | 3/1988 | Japan. |
| WO9317135 | 9/1993 | WIPO. |

Primary Examiner—Scott Kastler

[57] ABSTRACT

A process and apparatus are disclosed for recovering a non-ferrous metal, preferably aluminum and aluminum alloys, in molten coherent form from a charge of material to be processed containing the metal. The charge is introduced into a sealable furnace which is then sealed. The charge is agitated. A control parameter indicative of conditions inside said furnace is monitored and compared to a pre-determined first condition for the parameter. A heat source is operated to heat the charge until the control parameter reaches the first condition. The operation of the heat source is then stopped. A controlled amount of oxidizing agent and an inert carrier is then introduced into the furnace. The control parameter is monitored and compared to a predetermined second condition for the parameter. The flow of the oxidizing agent and the carrier is controlled to maintain the control parameter at about the second condition. The molten metal is subsequently removed from the furnace.

18 Claims, 8 Drawing Sheets

APPARATUS FOR RECOVERY OF NON-FERROUS METALS FROM SCRAP AND DROSS

This application is a continuation of application Ser. No. 08/470,005, filed Jun. 6, 1995, now abandoned which is a divisional of Ser. No. 08/201,335, filed Feb. 24, 1994, now U.S. Pat. No. 5,540,752.

FIELD OF THE INVENTION

This invention relates to a process and an apparatus for the recovery of non-ferrous metals, preferably aluminum, from dross and finely divided or thin scrap.

BACKGROUND OF THE INVENTION

Non-ferrous scrap (except scrap of magnesium and its alloys) which is not too thin, too finely divided or too contaminated with non-metallics typically may be recovered economically and without excessive metal loss by remelting in a reverbatory furnace without the use of salt fluxes. Somewhat finer or moderately contaminated scrap (e.g. relatively thin aluminum siding, mixed low copper clips, some delacquered can scrap, coarse scalper chips) is frequently processed in side-well furnaces in which the scrap is remelted. A burner heats the metal in the main hearth while the scrap is melted by submergence in the side-well without direct flame impingement. Salt fluxes are normally added to promote coalescence.

Due to its extreme reactivity in air, most magnesium scrap (even if heavy and clean) has to be melted under a liquid salt flux or in a protective atmosphere.

However, generally, the thinnest or most finely divided scrap (such as some used beverage cans, borings, turnings, sawings) and drosses or skimmings could not be processed in the above manners without excessive metal loss. Such fine scraps and drosses have normally been melted down in rotary barrel furnaces with the addition of substantial amounts of salt flux to reduce metal loss. Typically, for example in the case of aluminum, the amount of salt flux used is about equal to the weight of non-metallics in the charge of material to be proceesed. Thus, for example, for a 10 ton charge of a dross containing 60% metallic aluminum and 40% non-metallics, the material in the furnace would comprise 6 tons of aluminum, 4 tons of non-metallics, and about 4 tons of salt flux, for a total of about 14 tons. Eventually, 50–55% of the charge might be recovered as molten aluminum (in the example, 5.0–5.5 tons), and about 80–85% of the charge weight (in the example, about 8.0–8.5 tons) might remain as "salt cake". "Salt cake" is a substantial environmental problem and in many areas may no longer be dumped. There is also the significant problem that a substantial amount of salt is vaporized in such processes and then condenses as a fine fume which must be collected in elaborate baghouses. In addition, the salt causes corrosion problems at most stages in the process.

Many attempts have been made to operate conventional rotary barrel furnaces without salt flux. If the charge is dross or fine scrap, the results have generally been unacceptable. For example, as a charge heats up, hot spots can develop and the rate of oxidation can increase rapidly. Within a short while, the heat generation is excessive and temperatures rise rapidly with much loss of metal by oxidation. In extreme cases, outside air is sucked rapidly into the furnace resulting in even more oxidation. Such run-away reactions can produce extremely high, even dangerous, temperature conditions, sometimes well in excess of 1500 C.

Recently, a modified rotary barrel process and apparatus have been developed which avoid the use of salt fluxes in the recovery of non-ferrous metals from dross. In such process, the dross is fed into a rotary barrel furnace, usually but not necessarily tiltable. The dross is then heated by a plasma torch. In the case of aluminum dross, the dross is heated to about 800 C., well above the melting point of aluminum at 660 C. When this temperature (i.e. 800 C.) is reached, the torch is turned off and the furnace flooded with argon. This arrests the oxidation which would otherwise continue. The furnace is rotated for some further period to agglomerate the metal, which is then tapped off or decanted. Finally, the residues are removed from the mouth of the furnace by scraping or tilting.

While the above process has eliminated the serious disadvantages arising from salt fluxes, it too has significant problems. A fundamental deficiency of this process is that it does not allow for optimum control of the process—either during the heating phase or during the agglomeration phase. In particular, the charge is not maintained at the optimum temperature during the final agglomeration phase. In addition, the required use of a plasma torch has some further significant disadvantages. First, it increases the capital cost of the installation very substantially. Second, maintenance of plasma torches is generally more expensive and more complicated than for conventional burner systems. Third, the cost of electricity as an energy source is, in many areas, more than the cost of appropriate fossil fuels such as natural gas or oil. Notwithstanding such deficiencies, it is understood that a plasma torch is required because of its lower gas flow requirements. Published data suggest that, for equal thermal inputs to the furnace, exhaust gas flow from a plasma torch using air in accordance with present commercial practice is about one quarter that from a conventional fuel-air burner. Decreased gas flow is considered desirable because it results in decreased stack losses and a smaller and less complex furnace exhaust gas system.

Most prior art furnaces which are intended to be "closed" have doors which abut up against the lip of the furnace chamber opening. However, uneven build up of residue and damage to the lip frequently prevent such doors from closing effectively. The end result is that such furnaces are virtually open to atmosphere, making them very difficult to operate properly.

SUMMARY OF THE INVENTION

According to one aspect of the invention, a process is disclosed for recovering a non-ferrous metal in molten coherent form from a charge of material to be processed containing the metal. The process comprises introducing the charge into a sealable furnace and sealing the furnace. The charge is agitated. A control parameter indicative of conditions inside said furnace is monitored and compared to a pre-determined first condition for the parameter. A heat source is operated to heat the charge until the control parameter reaches the first condition. The operation of the heat source is then stopped. A controlled amount of oxidizing agent and an inert carrier is then introduced into the furnace. The control parameter is monitored and compared to a predetermined second condition for the parameter. The flow of the oxidizing agent and the carrier is controlled to maintain the control parameter at about the second condition. The molten metal is subsequently removed from the furnace.

According to another aspect of the invention, a process is disclosed for recovering a non-ferrous metal in molten coherent form from a charge of material to be processed, the charge having a temperature in excess of a pre-determined first temperature and containing the metal. The process comprises introducing the charge into a sealable furnace and sealing the furnace. The charge is agitated. Controlled amounts of oxidizing agent and an inert carrier are introduced into the furnace. A control temperature is monitored and compared to a predetermined second temperature. The flow of the oxidizing agent and the carrier is controlled to maintain the control temperature at about the second temperature. The molten metal is subsequently removed from the furnace.

According to yet another aspect of the invention, an apparatus is disclosed for recovering a non-ferrous metal in molten coherent form from a charge of material to be processed, said material containing the metal. The apparatus comprises a sealable furnace adapted to receive the material, means to agitate the material, means to introduce an oxidizing agent into the furnace, means to introduce an inert carrier into the furnace, means to monitor conditions inside the furnace, and means to control the flow into the furnace of the oxidizing agent and the carrier responsive to the monitored conditions until such time as a pre-determined desired condition of the material is reached and thereafter to maintain the material at the condition until it is removed.

According to yet another aspect of the invention, a fertilizer for conditioning soil comprises aluminum dross residue containing nitride compounds.

According to yet another aspect of the invention, a fertilizer for conditioning soil comprises aluminum dross residue containing nitride compounds produced by the process of recovering aluminum metal in molten coherent form from a charge of aluminum dross, the charge having a temperature in excess of a pre-determined first temperature, by agitating the charge in a sealed furnace and introducing controlled amounts of nitrogen and an inert carrier into the furnace, monitoring a control temperature and comparing same to a predetermined second temperature, controlling the flow of nitrogen and the carrier to maintain the control temperature at about the second temperature, and, subsequently removing dross residue from the furnace.

The processes and apparatus of the invention avoid the use of salt fluxes and all of the problems inherent therewith. In addition, the use of a plasma torch is not required. Finally, a greater degree of control of the reaction is provided, allowing for a more effective recovery of metal.

BRIEF DESCRIPTION OF THE DRAWINGS

Preferred embodiments of the invention are shown in the drawings, wherein.

Figure 1:
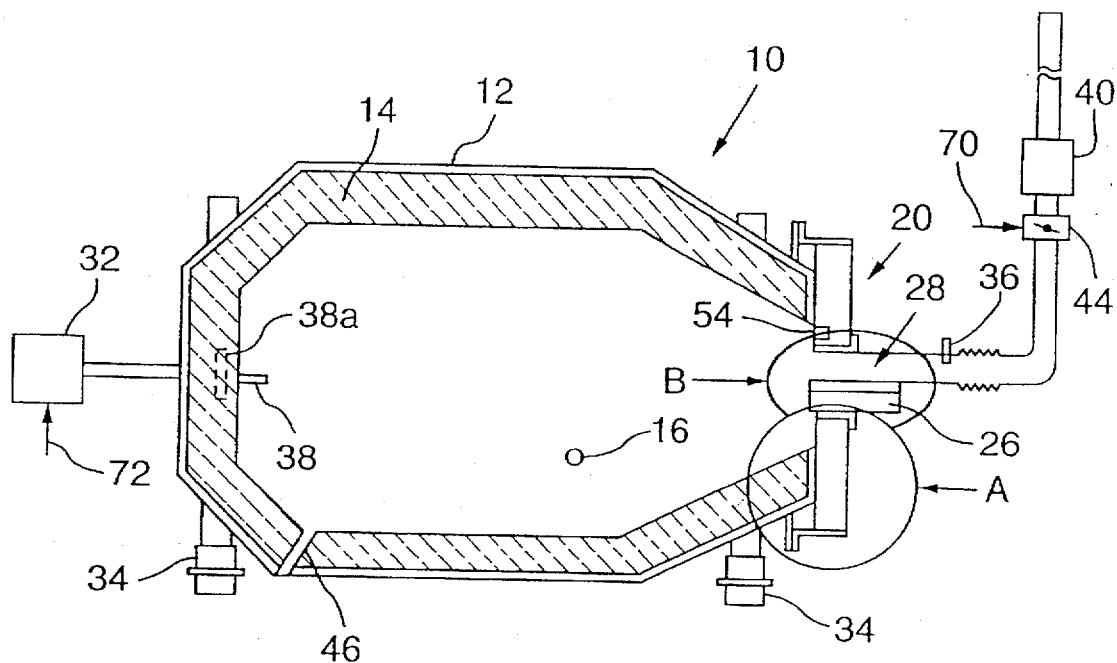
FIG. 1 is a cross-section schematic of a rotary furnace according to the invention, in a horizontal, non-operating condition.
Figure 1A:
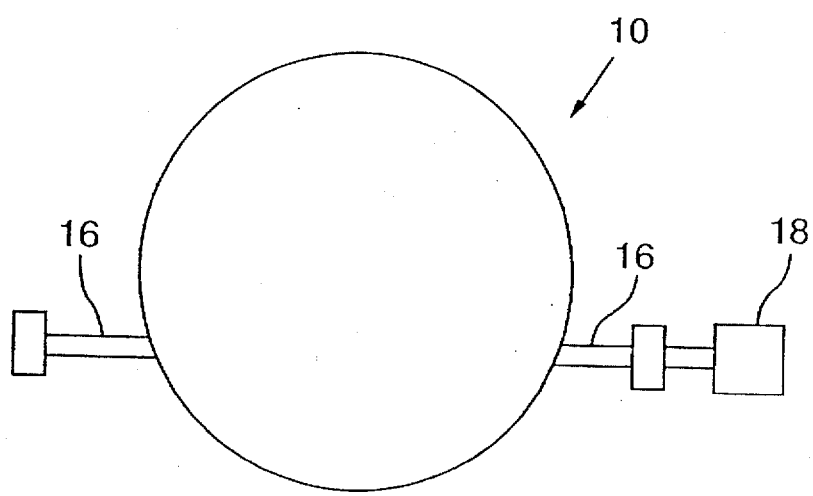
FIG. 1a is an end view schematic of a rotary furnace according to the invention, in a non-operating condition.
Figure 2:
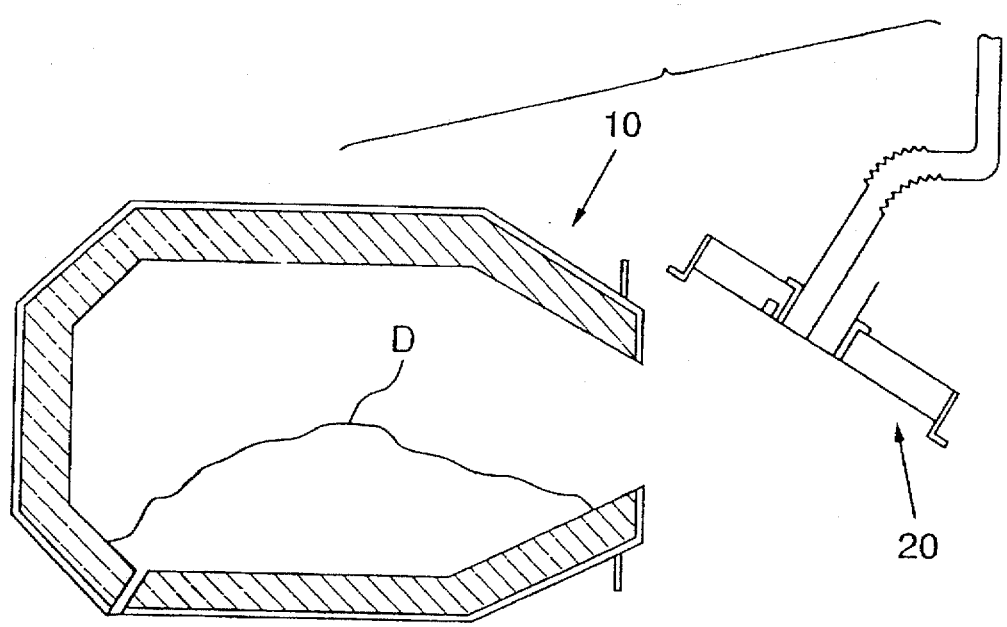
FIG. 2 is a cross-section schematic of a rotary furnace according to the invention, in a charging position.
Figure 2A:
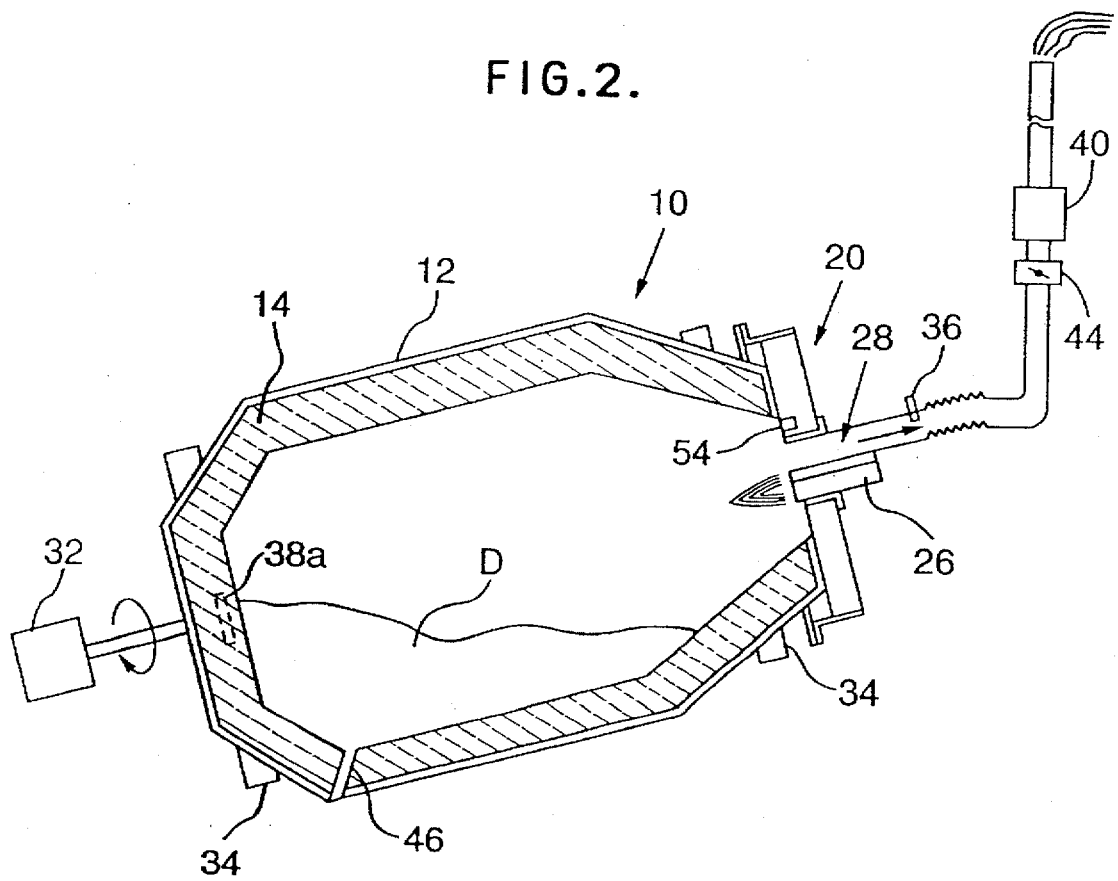
FIG. 2a is a cross-section schematic of a rotary furnace according to the invention, in an operating condition during an active heating phase.
Figure 2B:
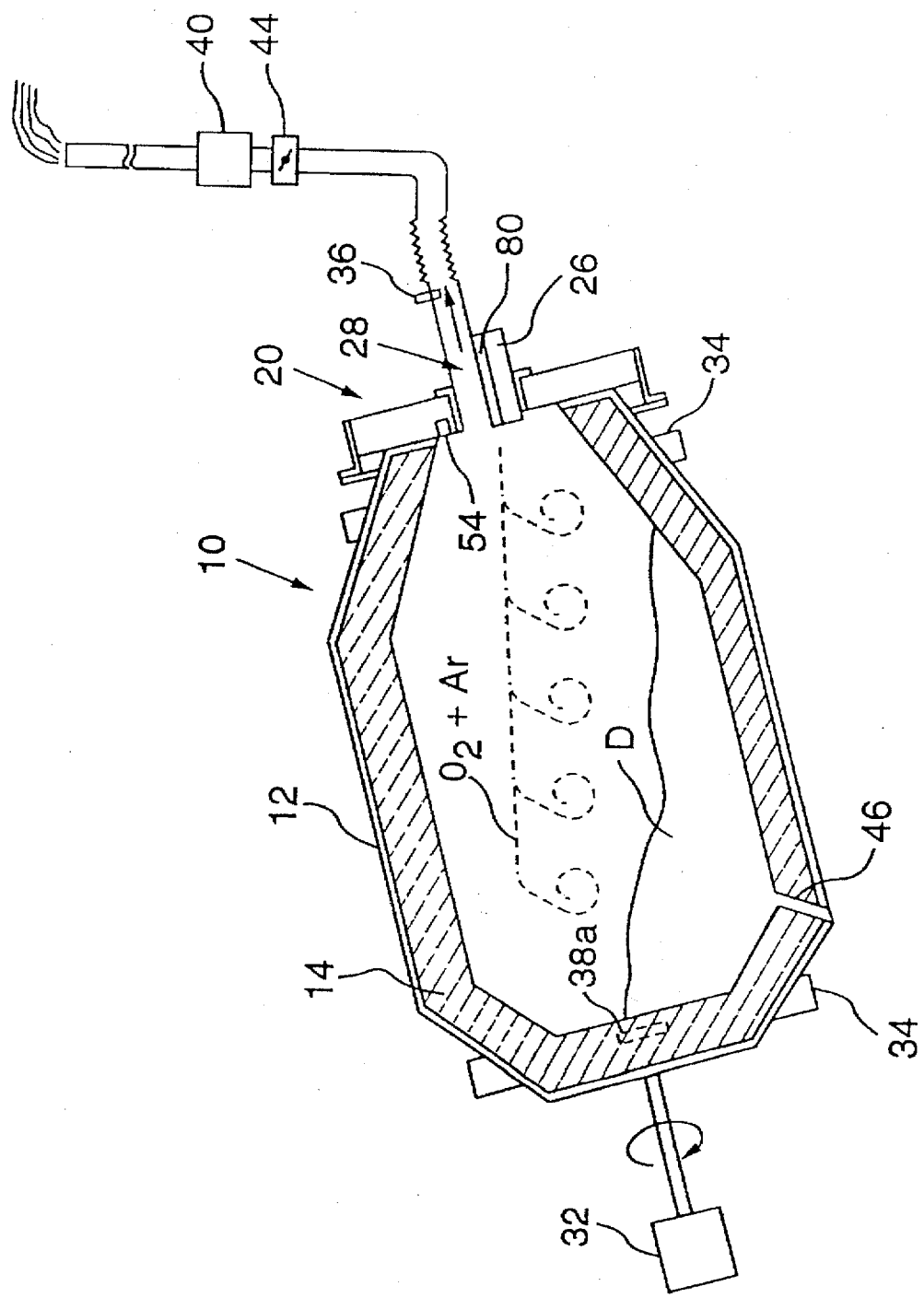
FIG. 2b is a cross-section schematic of a rotary furnace according to the invention, in an operating condition during a controlled gas flow phase.
Figure 3:
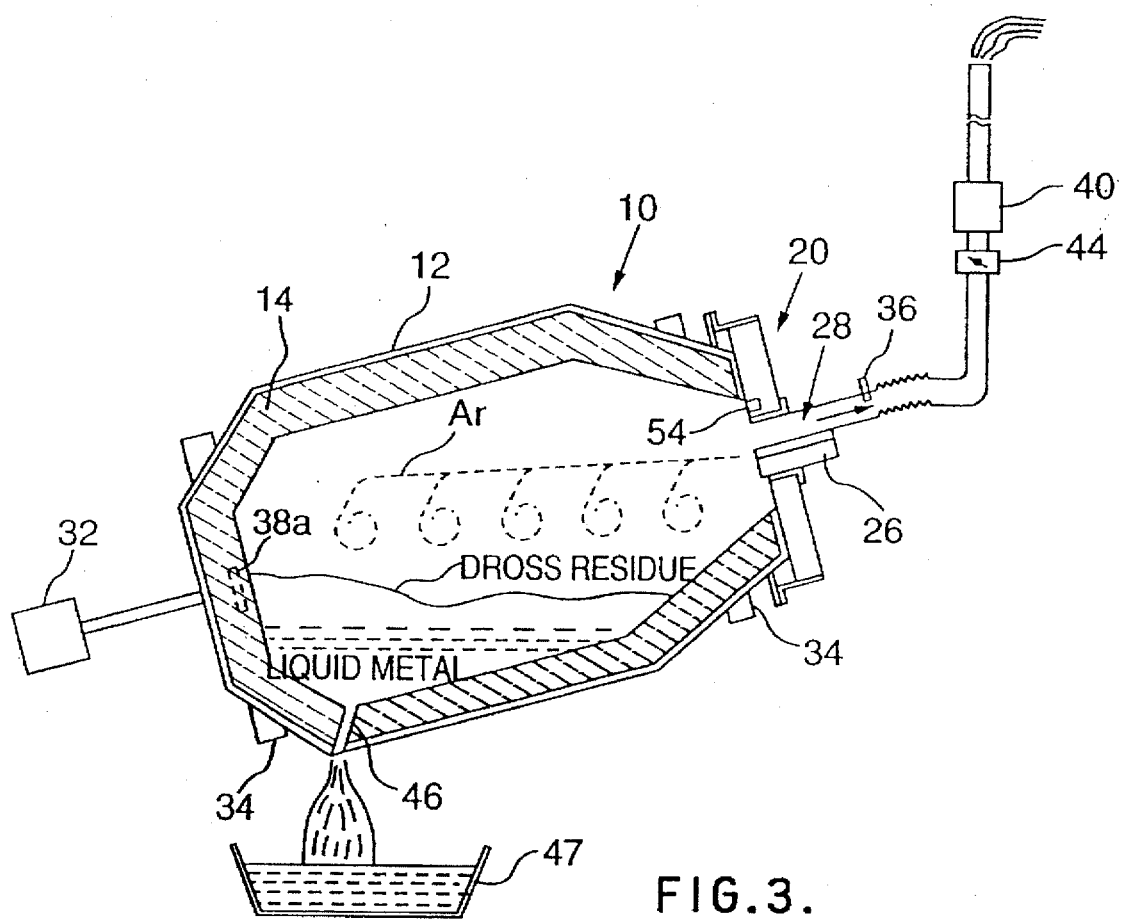
FIG. 3 is a cross-section schematic of a rotary furnace according to the invention, in a tapping operation.
Figure 4:
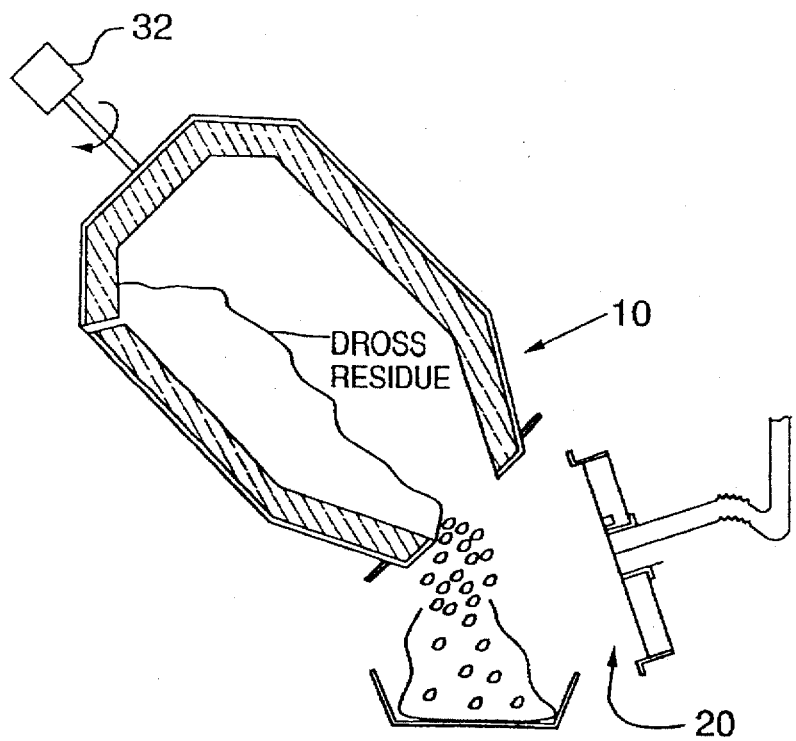
FIG. 4 is a cross-section of a rotary furnace according to the invention, in a residue discharging operation.
Figure 5:
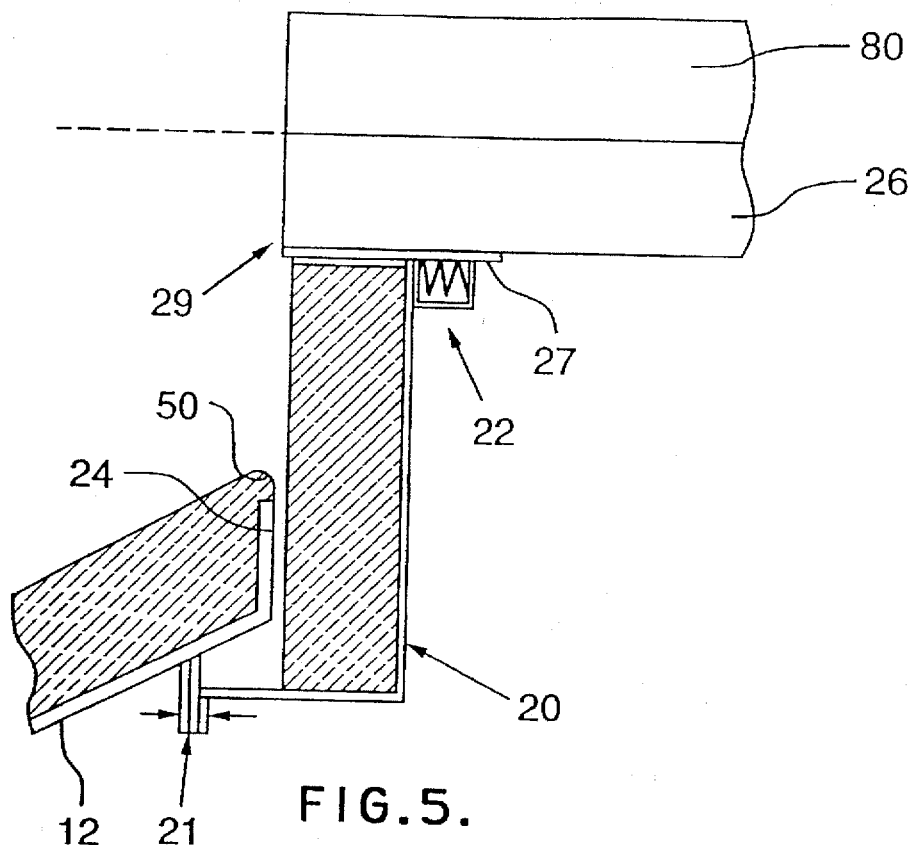
FIG. 5 is detail A of FIG. 1, showing the sealing arrangement between the door of the rotary furnace and the fixed burner supporting structure.
Figure 5A:
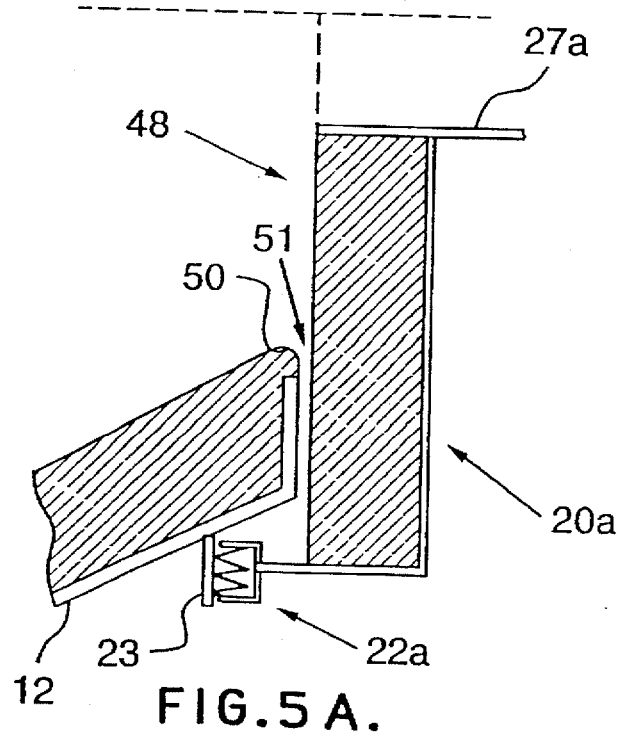
FIG. 5a shows the details of an alternate embodiment of a sealing arrangement between a fixed door and burner arrangement and the rotary furnace.
Figure 6:
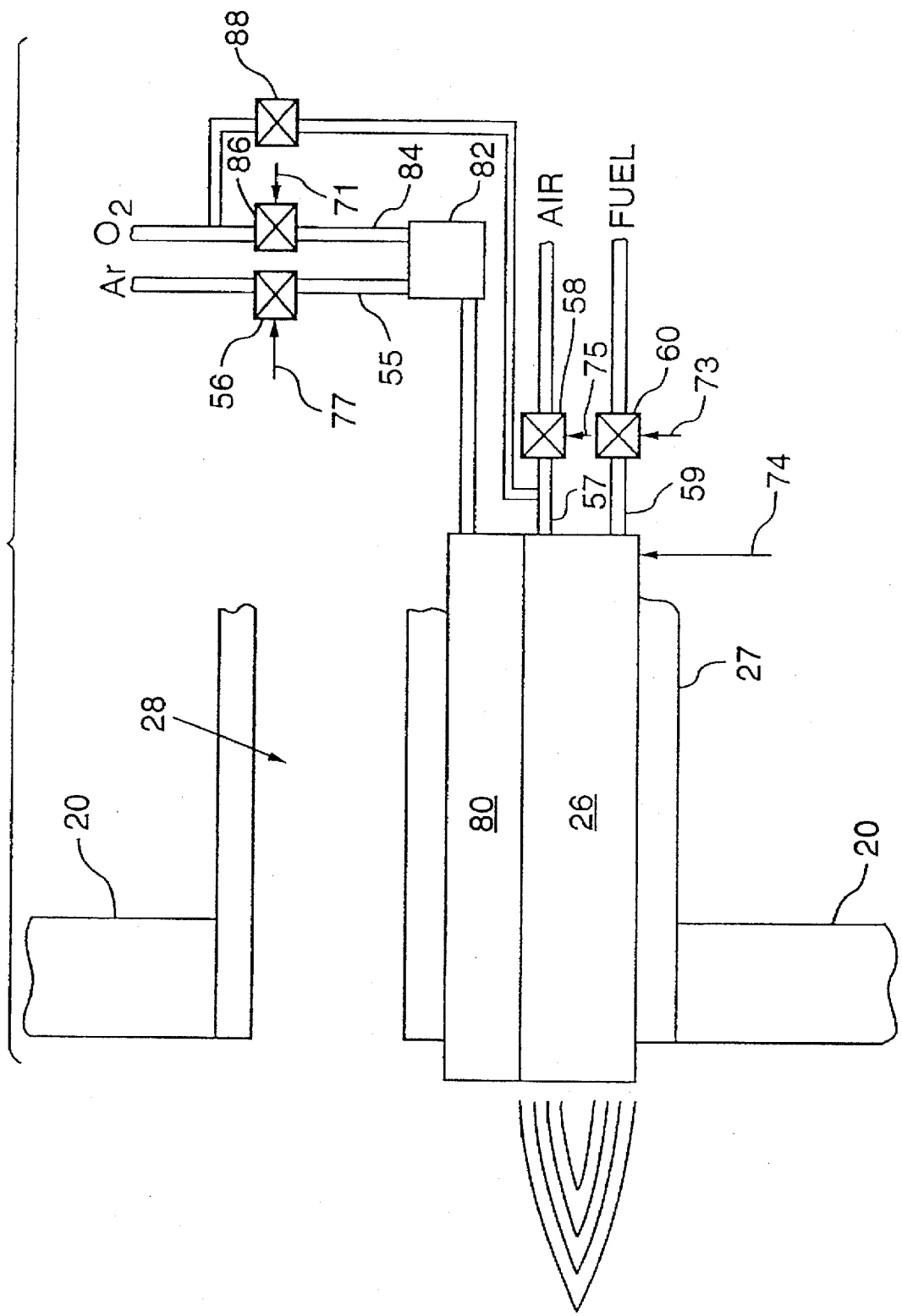
FIG. 6 is detail B of FIG. 1, showing the schematic details of the burner assembly.
Figure 7:
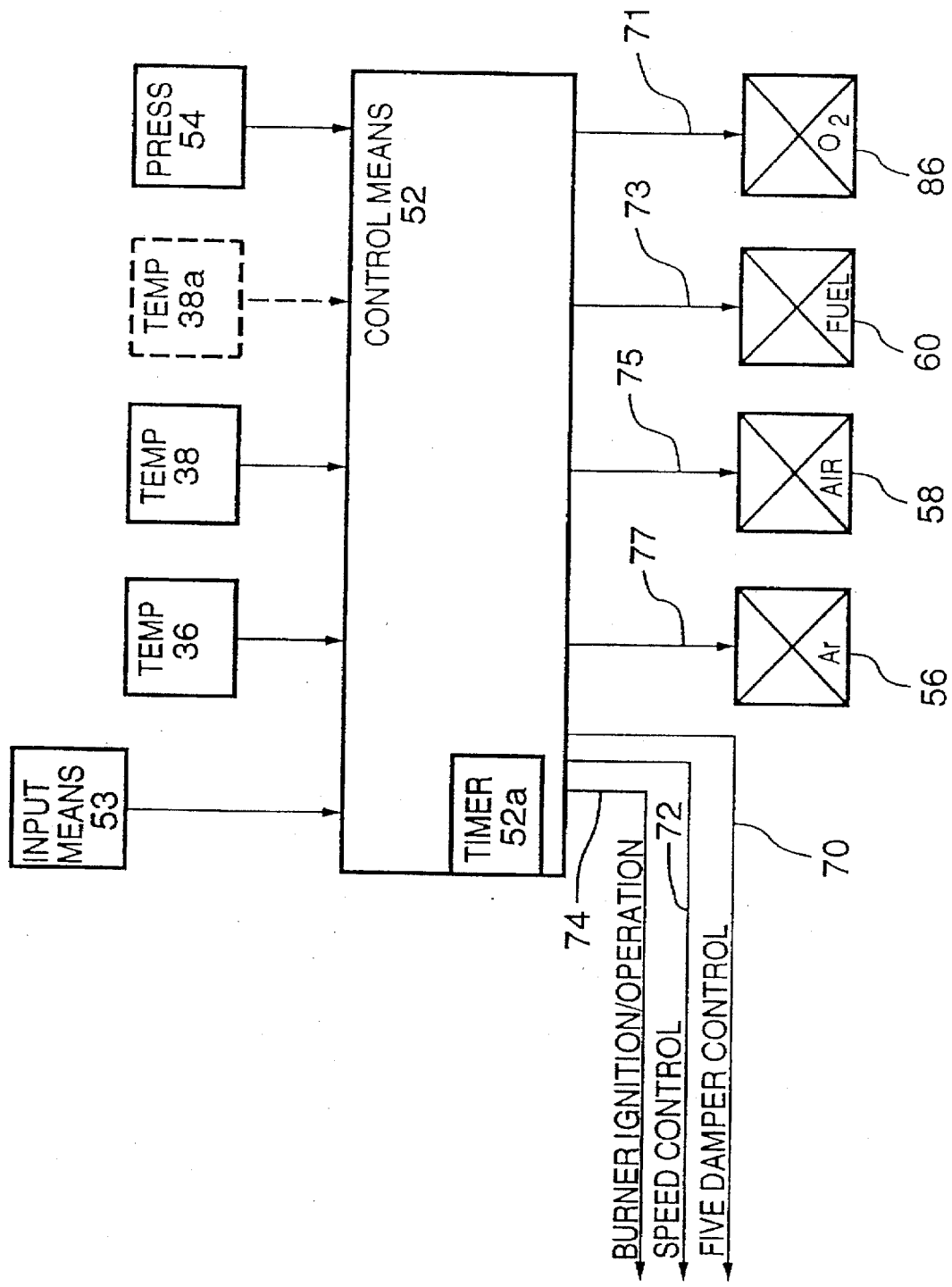
FIG. 7 is a block diagram showing the control system for the burner and gas flow controls.
Figure 8:
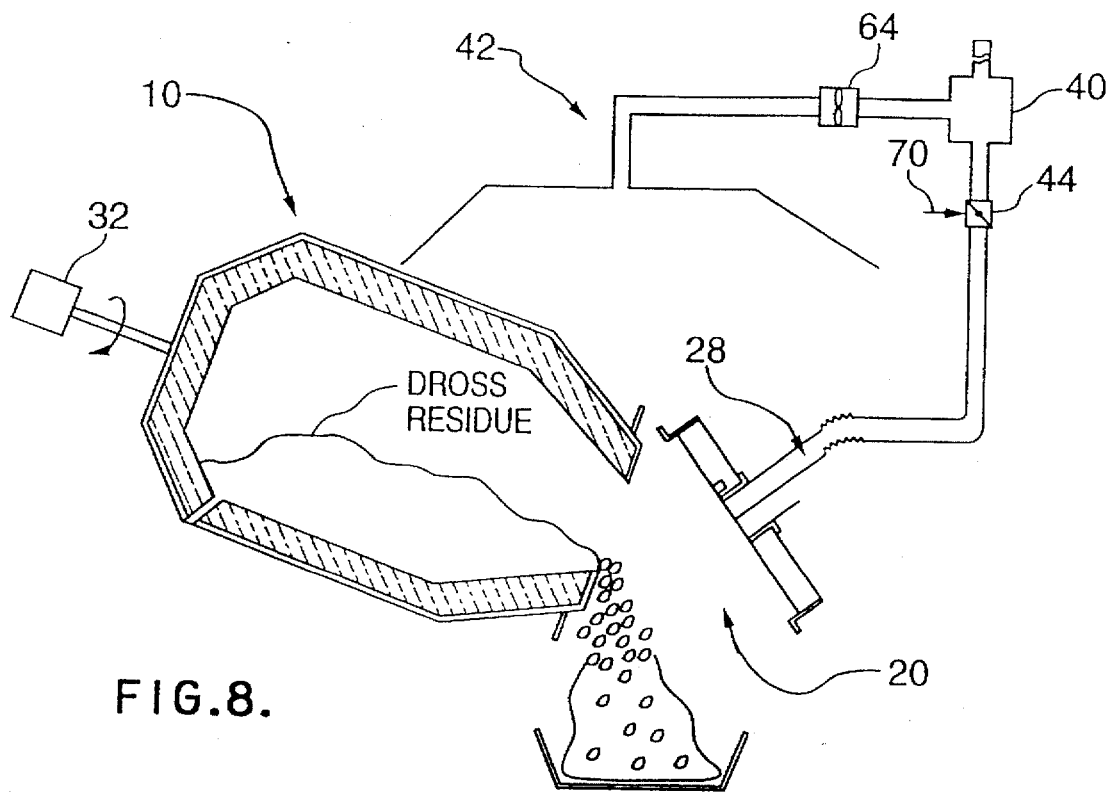
FIG. 8 is a schematic showing the fume and dust control system associated with the furnace; and, FIG. 9 is a schematic showing an alternate embodiment of the furnace.
Figure 9:
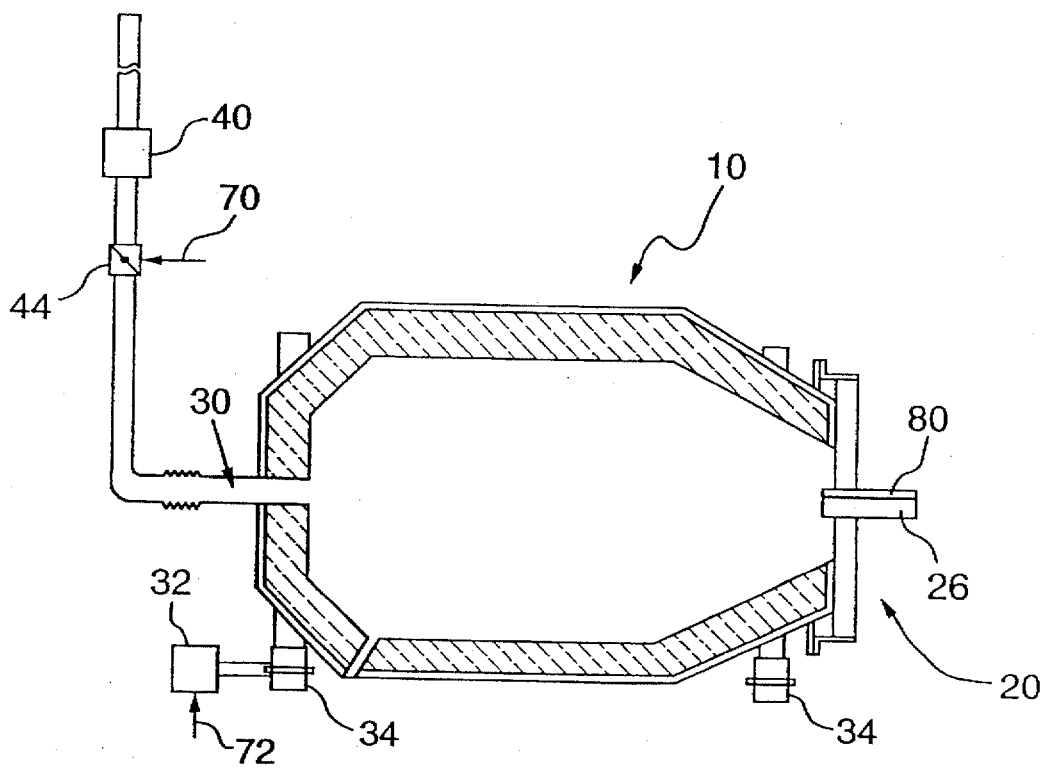

DETAILED DESCRIPTION OF THE PREFERRED EMBODIMENTS a. Materials to Be Processed

The materials to be processed are drosses and finely divided or thin scraps of non-ferrous metals such as aluminum, magnesium, copper, zinc and alloys of any of same.

It is expected that one of the most preferred areas of utility of the present invention will be in the processing of aluminum (which is to be understood as also including aluminum alloy) dross. Aluminum dross has a wide range of metallic aluminum contents, varying from 80% down to less than 15%. It is doubtful that it is economical to process directly dross with less than 35% metal content (it is usually preferable that drosses of such low metal content be first processed by milling and screening in conventional fashion to obtain a fraction of higher metal content for subsequent processing in the furnace). In typical drosses obtained from modern dross cooling methods, the particles have a metal content of about 45 to 70% aluminum. The physical structure of dross also varies widely from large lumps or blocks weighing possibly a ton to fines of less than 1 mm diameter.

Aluminum scrap may be processed according to the process of the invention. In general, scraps which would be processed have, after drying and/or delacquering, a higher metal content than drosses. Typically, the metal contents would be over 90%.

Typically, the temperature of the materials to be processed is much lower than the temperatures at which optimum metal recovery can take place. For very reactive materials, the lowering of temperature may have been done purposefully to reduce reactivity during handling. For other materials, natural cooling (even to ambient temperature) may simply have been allowed to take place. Such materials are typically considered "cold".

However, some materials may be at relatively high temperatures, much closer to the optimum recovery temperatures. Such materials are considered "hot". For example, hot aluminum dross (e.g. skimmed from an aluminum production furnace) will generally be at or about the melting point of aluminum if it is charged to the processing furnace promptly. Being more reactive than cold materials, hot materials often require care in handling.

In the case of aluminum dross, a charge is preferably heated ultimately to about 700–900 C. and preferably to a temperature in the range of about 750–850 C. Numerous studies have shown that the rate of oxidation is quite slow up to temperatures in the range of about 600–700 C., provided that the charge is mixed well enough by rotation that no hot spots are allowed to develop. At somewhat higher temperatures (say about 675–800 C.), fine aluminum begins to react rapidly with various readily available oxidizing agents–e.g. first with oxygen (starting even at about 600 C. according to the literature). At even higher temperatures (over 800 C.), the fine aluminum will react with nitrogen (starting at about 800 C. according to the literature) and at higher temperatures still even with carbon dioxide. Above about 800 C., the reaction is extremely rapid and finely divided aluminum burns vigorously in oxygen. Further handling or processing of such high temperature materials can be complicated by the fact that the products of combustion of aluminum in oxygen, nitrogen and air are solids.

b. Apparatus

Referring to FIG. #1, a furnace according to the invention is generally indicated as 10. Furnace 10 has a generally cylindrical barrel or chamber 12 lined with a suitable refractory material 14. In the preferred embodiment, chamber 12 is of the short barrel-type, where the internal length of the chamber is less than 1.5 times its internal diameter. Chamber 12 has a lip 50 which defines a mouth or opening 48 at one end. Opening 48 must be wide enough that the largest lumps of dross can be fed into the interior of chamber 12 and also be large enough to accommodate the burner, exhaust vent and gas nozzle, all as described below. In an alternate embodiment, the chamber could be of the long barrel-type (i.e. having an internal length greater than 1.5 times its internal diameter).

Preferably, there is a mechanism (indicated generally in FIG. #1a as 18) for tilting chamber 12 about a transverse axis 16 when desired, although in some embodiments, chamber 12 could be mounted with its longitudinal axis generally horizontal. Preferably, the furnace 10 may tilt between about 15° to 40° to the horizontal, depending on the length/diameter ratio and the size of opening 48.

One or both ends of furnace 10 may be equipped with a closable door, e.g. as generally shown at 20, to permit charging of furnace 10 and removal of its contents. The door 20 may rotate with the furnace (FIG. #5) or be stationary (see door 20a, FIG. #5a). If both ends of the furnace are not equipped with such doors, then, as shown in FIG. #1, one end of furnace 10 would normally have a permanent end wall and the other the door 20.

Furnace 10 is provided with means for agitating the charge placed therein. Rotation, rather than other types of agitation, is preferred as there is less likelihood that hot or cold spots would develop in a charge. Accordingly, means 32 for rotating the chamber 12 about its longitudinal axis is provided. Rotating means 32 most desirably incorporates means for controlling the speed and/or direction of rotation. Of course, bearing means 34 are provided to support furnace 10 during rotation.

Chamber 12, which is rotatable, is sealable, meaning that the ambient atmosphere can be substantially excluded from the interior thereof. According to the invention, a sealing arrangement 22 is provided between the rotatable furnace and the fixed burner, nozzle and vent structures. Under normal operating conditions, the interior of chamber 12 will be maintained at about atmospheric pressure. Sealing arrangement 22 does not have to be airtight, but it should in case furnace pressure is slightly negative at most allow only an insignificant airflow into furnace 10 during normal operation. The term "insignificant" in this context means that the amount of air allowed into the furnace 10 should not be so great as to significantly interfere with the control of the gas flow into the furnace as described below. Likewise, in case furnace pressure is slightly positive, sealing arrangement 22 should only allow a minimal amount of gas and dust to pass into the environment.

As shown in FIGS. #5 and 5a, in the furnace of the invention, the sealing arrangements 22 and 22a are disposed away from the lip 50 of chamber 12. It is to be appreciated that the sealing arrangement should preferably be set back from the interior of chamber 12 as far as is reasonably possible. The reason for this is that seals made at or near the lip of a rotary furnace used for aluminum melting may rapidly degrade because of residue build-ups or erosion at the lip.

In the FIG. #5 embodiment, door 20 is fixed to rotatable chamber 12 by appropriate removable fastening means 21. Burner assembly 26 is mounted in a fixed sleeve 27. Sleeve 27 will have a reasonably tightly toleranced fit within an opening 29 in door 20. The sealing arrangement 22 is between the door and fixed outer surface of sleeve 27.

As shown in FIG. #5a, in another embodiment of a sealing arrangement, sleeve 27a and door 20a are affixed together. The outer surface of rotatable chamber 12 is provided with an annular flange 23 disposed away from chamber opening 48 and lip 50. The sealing arrangement 22a is between the door and annular flange 23. Gap 51 should preferably be made as small as possible in order to reduce the possibility of aluminum dross being able to have access to and cause damage to sealing arrangement 22a, but large enough that the normal build-up of dross residue at the lip will not interfere with the effectiveness of sealing arrangement 22a.

Chamber 12 may be heated from within by a heat source, such as torch or burner, indicated generally as 26 (see FIG. #2a), which is mounted via sleeve 27 in door 20. Burner 26 may be any conventional burner (e.g. fuel-air, oxy-fuel, or oxygen enriched fuel-air burners) or plasma torch. However, preferably, burner 26 is of the conventional fuel/air type because of its low capital cost and low operational and maintenance costs. In addition, conventional fossil fuels, such as natural gas and oil, are in many places generally more readily and inexpensively available than the necessary electrical power required by an electric arc plasma torch. An oxy-fuel burner or a plasma torch may be preferred if low gas flow is required through furnace 10.

Furnace 10 would normally be operated with one burner, though more than one can be used if desired. The largest single burners available in oil or natural gas are much larger than the largest plasma torches presently available and would be adequate for any practical rotary furnace. It would normally be positioned to pass through to door 20 more or less near the longitudinal axis of furnace 10.

As shown in FIG. #6, air-fuel burner 26 is supplied by a fuel line 59 and an air line 57. The flow of fuel is controlled by valve 60, which may be automatically actuated. Likewise, the flow of air is controlled by valve 57, which may also be automatically actuated. Burner 26 includes a conventional ignition control system (not shown).

Furnace 10 is also provided with nozzle means 80 for introducing various combustion and other gases into the furnace. It would also normally be positioned to pass through door 20 and more or less near the longitudinal axis of furnace 10. Nozzle 80 is supplied from mixing chamber 82 into which line 55 supplies an inert carrier gas, such as argon, helium, neon or krypton (normally argon would be selected for economic reasons), and line 84 supplies an oxidizing agent, such as oxygen. The flows of inert carrier gas and of oxygen are controlled by valves 56 and 86 respectively, which may be automatically actuated. The flow of oxygen is controlled to maintain the required degree of oxidation inside the furnace. The flow of inert carrier gas can be controlled, along with the position of certain damper controls (see below), to maintain the pressure inside furnace 10 at about atmospheric pressure.

If oxygen is used as the oxidizing agent and an air-fuel burner 26 is used, the air supply to burner 26 can be oxygen enriched (if desired) by providing an oxygen bleed valve 88 between the oxygen source and the air supply 10 line 57 to burner 26 and controlling the oxygen bleed according to the degree of enrichment desired.

There must be sufficient venting, usually at one end or the other of the furnace, to allow for the escape to atmosphere of gases introduced into the furnace by the burner, given off by the scrap or dross charge, or introduced to control the temperature of the charge. In the embodiment illustrated in FIG. #1, an exhaust or flue vent is located immediately above burner 26 and nozzle 80 and is indicated generally as 28. In an alternate embodiment, as shown in FIG. #9, a vent 30 is shown at an end of chamber 12 opposite to burner 26. Vent 28 is in any event provided with a control damper 44, which can be used to assist in control of the pressure in furnace 10.

To enable the temperature of the charge to be controlled during the process, it is necessary that means 36 be provided to monitor the temperature at least in the flue or vent 28 where exhaust gases exit from furnace 10. In addition, it would also be preferable to provide further temperature monitoring means 38 in the charge itself. However, due to extreme conditions inside the furnace, it is usually difficult to secure meaningful charge temperatures at least on a continuous basis. Accordingly, it is usually more practicable to have a temperature monitoring means (shown in phantom as 38a), located inside the refractory material 14 of furnace 10. Either or both of the temperatures of the exhaust gas and refractory provide an indirect indication of the charge temperature and through experiment can be correlated thereto. Such temperature measurements will be used to control, as described below, when the fuel burner must be shut off and thereafter what amounts of inert gas and oxygen are to be added.

As shown in FIG. #7, the process is controlled, either manually or by an automatic control means 52 (e.g. a microprocessor), by monitoring conditions inside the furnace 10 and making adjustments accordingly to the various gas flow rates. For example, the most important condition inside the furnace 10 is the temperature of the charge. Charge temperature, as noted above, is monitored indirectly via temperature monitoring means 36 and 38 or 38a. In addition, pressure inside furnace 10 can also be monitored, e.g. by pressure measuring means 54 located inside furnace 10. Control means 52 compares the various measurements to pre-determined standards or target ranges and will send signals to actuated valves 56, 58, 60 and 86 accordingly via control connections 77, 75, 73 and 71 respectively. For example, if charge temperature is too low, control means 52 will open fuel and air valves 58 and 60 and cause ignition of burner 26 to initiate heating. If charge temperature is within a first target range, control means 52 will close fuel valve 60 and air valve 58 to shut off burner 26 and open oxygen valve 86 and argon valve 56 to pre-determined positions to allow aluminum combustion to proceed at a controlled rate. When charge temperature has reached a final target, control means 52 will operate valves 86 and 56 to maintain the desired target temperature. Ultimately, when it is determined that the charge has been maintained at the final target temperature for a sufficient period, control means 52 will operate to both close oxygen valve 86 and open argon valve 56, to stop all further heating and combustion. Throughout the process, via control connections 70 and 77, control means 52 operates argon valve 56 and/or flue damper 44 to maintain pressure in the desired range.

Input means 53 allows users to input data concerning the material being processed, desired target temperatures and temperature ranges, time parameters and other relevant parameters.

Control means 52 is also capable of controlling other aspects of the operation of furnace 10. For example, it may also control the rotational speed/direction of rotating means 32 and ignition of burner 26 via connections 72 and 74, respectively. In addition, control means 52 may be provided with a timer means 52a, in order effect control operations responsive to elapsed time sequences.

Because of dust loading, exhaust gas from the furnace is preferably passed through a bag-house 40. As noted above, exhaust gas from a plasma torch is substantially less than for a conventional fuel-air burner, theoretically allowing for a reduced size exhaust gas system. However, the inventor has come to the unexpected realization that the heaviest loading on the gas/dust collection system arises not during burner or torch operation, but rather when as shown in FIG. #4 the furnace 10 is being cleaned out with the closable door 20 in the open position. The fume and dust collection system has to be sized to handle this surge load. In other words, regardless of the theoretical advantages of a plasma torch-based system, fume and dust collecting systems of substantial size are required to be able to handle the processes of unloading or cleaning the furnace.

For example, as shown in FIG. #8, a fume and dust collecting system 42 is provided. Bag-house 40 connected to exhaust vent 28 is a component in the complete system 42. Other components could be, for example, collection hood 62 and fan 64.

c. Process

Furnace 10 is normally operated on a batchwise basis, although some types of scrap could be handled on a semi-continuous basis.

Referring to FIG. #2, chamber 12 is loaded by any suitable means with a charge D of typical aluminum dross. The quantity charged should preferably not exceed an amount which will fill furnace 10 beyond the level of its mouth 50 when in the tilted position.

Chamber 12, if not already in the tilted position for loading, is then tilted back to its operating position and the closable door 20 is brought forward and sealed to the furnace. The burner 26, exhaust duct 28 and nozzle 80 are attached.

Referring to FIG. #2a, if charge D is "cold", burner 26 is turned on and the rotation of chamber 12 is started. This phase of the process may be considered to be an active heating phase. If large dross lumps are present, the initial rotation must be very slow to avoid damage to the refractory lining—i.e. probably less than one r.p.m. and possibly even intermittent. The rotation must be sufficient though to avoid hot spots forming in the dross D or the refractory material 14. If the dross D has no large lumps, the rotation can be somewhat faster, which promotes more uniform heating of the dross batch, and thus enables a larger heat input to be used, with a resultant shortening of the operating cycle. To avoid excessive dusting, the rotational speed should preferably be less than about 100 surface feet per minute of the inner surface of the refractory lining (e.g. if the internal diameter of the furnace is 10 feet, the speed would be about 3 r.p.m.). Even if there are large lumps, the speed can be increased to about this range once the charge D is at about 500 C. Control of rotational speed is preferably effected automatically by control means 52.

Control means 52 continuously evaluates charge temperatures by monitoring the flue gas temperature measuring means 36 and, if available, refractory temperature measuring means 38a.

At a certain point, charge D begins to react rapidly with the oxidizing agent, indicated primarily by the level of the flue gas temperature compared to a certain pre-determined first target value. (It may also be possible to monitor the rate of change of the flue gas temperature compared to a predetermined target value.) Such target value may be determined empirically. However, generally, the first target temperature corresponds to a charge temperature of about the melting point of aluminum (660 C.) but it may vary from about 600–700 C. depending on the alloy, the physical structure of the dross and the rate of heat input to the furnace. It is believed that it is the finest aluminum particles which oxidize first, thus providing heat of combustion to the charge D. These particles normally would not agglomerate well (even in a salt flux process) and normally would be disposed of ultimately as part of the dross residue. Accordingly, use of such particles for combustion or heating purposes, as relied upon by the process of the invention, is a factor tending to improve the overall efficiency of the process.

If available, measurements from charge temperature measuring means 38 and/or 38a may also be used in assessing the point of rapid charge reaction, either alone or in conjunction with flue gas temperatures.

It is to be appreciated that burner 26 operates at a very high temperature, e.g. up to say 1500 C. The flue gas temperature in theory has the capability of approaching the temperature of the heat source. At higher temperatures, use of the flue gas temperature to control the process when the burner is operating becomes increasingly unreliable because of a higher temperature differential between the flue gas and the charge. However, when charge D begins to react rapidly, the charge itself becomes a significant heat source for heating itself. If the burner is then shut off, there is no longer a 1500 C. heat source. Instead, there is only a heat source in the 600–900 C. range. The flue gas temperature differential will be reduced substantially, to a value much closer to the temperature of the charge itself. This reduction of the differential between the temperature of the flue gas and the charge is preferred for controlling the process at the higher temperatures.

When the rapid reaction point is detected by control means 52, as shown in FIG. #2b, burner 26 is turned off (i.e, the fuel and air valves 58 and 60 are shut) and the exhaust flue damper 44 closed to less than five per cent of its full open position. This phase of the process may be considered to be a controlled gas flow phase. The inert carrier gas and an oxidizing agent are turned on at valves 56 and 86, mixed in chamber 82 and introduced into furnace 10 at nozzle 80. Control means 52 controls their flows so that the temperature of the dross D increases by oxidation of the finer particles of aluminum in the charge to a second target temperature corresponding to a charge temperature in the range of about 700–900 C., preferably in the range of about 750–800 C.

During the above step in the process, the energy to achieve the final target temperature comes from the combustion of the finest aluminum particles. Because there is increased reliance on use of an otherwise discarded fuel (i.e. aluminum fines), less fossil fuel is used by the process.

Typically, the oxidizing agent would be oxygen. However, air could be used if nitrogen compounds, such as nitrides, in the dross residue are not problematic.

Once the second target temperature is reached, the oxygen and argon flows are controlled to maintain the charge at about that temperature, in a phase conveniently identified as the final agglomeration stage. During this phase, furnace 10 continues to be rotated with a surface speed of the refractory lining of 30 to 300 feet per minute, corresponding to 1 to 10 r.p.m. for a 10 feet diameter chamber. The speed is chosen to give the best agglomeration of the molten metal contained in dross D.

Throughout the above steps in the process, control means 52 monitors the pressure inside furnace 10. At any point in the active heating phase or the controlled gas flow phase, if the pressure changes sufficiently, control means 52 may operate to adjust the flue control damper and/or activate argon flow into the furnace to adjust the pressure accordingly.

Preferably, rotation during the final agglomeration stage is continued for a pre-determined length of time chosen to maximize agglomeration and the final recovery of metal. However, other conditions could be used to determine when to stop rotation. As shown in FIG. #3, the agglomerated molten aluminum, which collects below the depleted solid residues, is tapped off into crucible 47. Tapping is preferably by means of a taphole 46 located at the lowest point in furnace 10 when in the back tilt position. While tapping, the furnace door can remain sealed and the atmosphere in the furnace controlled. In an alternate embodiment, it is also possible by varying the procedures somewhat to avoid the use of the taphole and decant the metal from the mouth of the furnace.

After the metal has been tapped, it is normally desirable that furnace 10 again be rotated, again as shown in FIG. #2b, for a suitable further period to agglomerate any remaining recoverable metal with the furnace atmosphere continuing to be controlled to ensure the best operating temperature.

Referring to FIG. #4, after any tapping off of a second run of metal, furnace rotation is stopped. The argon and oxygen and any other gases are turned off and the closable door 20 is unsealed and opened. Chamber 12 is then tilted to the forward position with the open mouth 58 down and the residues removed or discharged. In general, the residues will to a large extent exit chamber 12 merely by rotating it at a few r.p.m. However, it is well known that all aluminum melting furnaces, other than those which operate with liquid salt fluxes, have problems with oxide residues attaching themselves to the refractory. A major part of the work involved in running a reverbatory fuel fired furnace in the secondary industry consists in keeping the walls clear of buildup. It is normal to scrape the walls after almost every batch. Thus means (not shown) must usually be provided to scrape adherent residues from the interior walls of the rotary furnace. For very small furnaces, this can be done by hand scraping. For larger furnaces, some mechanical assistance is necessary, which can be a scraper mounted on a piece of mobile equipment such as a fork lift truck, or a purpose built scraper such as used for hot metal crucible cleaning. The solid residues from the furnace will still have some finely divided aluminum which may be quite reactive when discharged. If it is desired to save this finely divided aluminum, the residues will have to be taken quickly to a suitable dross cooler. If, on the other hand, it is desired that the residues be free of aluminum metal, nitrides and carbides for use, e.g. in the refractory industry, then the residues may be further treated in furnace 10, after all the free metal has been tapped off, by further addition of oxygen and other gases or water substantially in repetition of the steps shown in FIG. #2b and 3.

For aluminum scraps, it may not be necessary or desirable to remove the solid residues after each charge of scrap, because the quantity of solid residues which are generated is a much smaller proportion of the charge compared to dross. Thus, after a single tap of the free metal from a first batch, the closable door may be withdrawn, another charge of scrap added, processed as for the first batch, and more metal tapped. This procedure could be repeated, even on a semi-continuous basis with some suitable feed mechanism, until the quantity of residues is such that the process is being adversely affected. For a last batch, there may be a second tapping of molten metal to minimize carry out of metal with the residue discharge.

Hot drosses from other aluminum melting and batching furnaces may also be processed in the same system. In this case, the drosses are generally charged to the rotary furnace at a temperature where no use need be made of the burner. Thus, the process can proceed directly to the controlled gas flow phase of addition of argon/oxygen to achieve the desired controlled temperature in the charge for best agglomeration. If the dross has been allowed to cool down too far before being charged to the furnace, the burner may have to be used for a short period to bring the temperature back up to the reactive level.

To reduce operating cost, provided that the increase in aluminum nitride content of the residue is not objectionable, the oxygen in the oxygen/argon gases used to control oxidation of the charge can be replaced partly or completely by air.

While the use of salt fluxes, which are liquid at or about the melting point of the metal being recovered, such as sodium, magnesium, calcium or potassium chlorides in the case of aluminum, is avoided in the present invention, various other reactive chemicals may be added to the furnace or the charge. These chemicals may be added to change the properties of the residues from the furnace to reduce water solubility, improve flow properties to facilitate cleaning of the furnace, or alter the reactivity of the hot residues in air. They may also be added to improve the agglomeration of the molten metal in the furnace, and to reduce the amount of metal entrapped in the residues removed from the furnace. These chemicals should be solid at the operating temperatures of the furnace and non-volatile. Examples are oxides or carbonates of such elements as magnesium and calcium, or oxides of boron or silicon. Gaseous chemicals may also be added to the inert gas/ oxygen flow into the furnace after the burner 26 has been shut off. Such chemicals could alter the metal agglomeration process in the furnace, or the reactivity of the residues when cleaned from the furnace. Examples would be sulphur hexafluoride (particularly when processing aluminum alloys containing magnesium, or magnesium alloys), chlorine, nitrogen, or carbon dioxide. There may also be occasions where it is desirable to add water, as liquid or vapor, to the furnace to lower the nitride or carbide content of the residues. Suitable structures (not shown) would be added to the apparatus for achieving the above functions and controlled appropriately, all in manners well known in the art.

The process of the invention may also be used for the production of alloys of the metal being processed. This may be achieved by adding proper amounts of the other material (e.g. copper, silicon) with which it is to be alloyed to the charge before or during the active heating phase.

As noted above, air could be used as the oxidizing agent if disposal of dross residue containing nitrogen compounds is not a problem. In certain instances, it may in fact be advantageous to have such nitrogen compounds in the dross residue. In particular, such nitrogen containing dross residue may be used as a fertilizer or soil conditioner. Accordingly, if production of such fertilizer or soil conditioner is desired, air may advantageously used as the oxidizing agent. It may even be possible to use nitrogen itself as the oxidizing agent, although this would require that the process be operated at higher temperatures (i.e. greater than 800 C.) than for the oxygen process described above.

Although preferred embodiments of the present invention have been described herein in detail, it will be appreciated by those skilled in the art, that variations may be made hereto without departing from the spirit of the invention or the scope of the appended claims.

The Embodiments of the Invention in which an Exclusive Pproperty or Privilege is claimed are defined as follows:

1. An apparatus for recovering a non-ferrous metal in molten coherent form from a charge of material to be processed, said material containing said metal, comprising:

a sealable furnace having an interior chamber to receive said material, said furnace being sealable to substantially exclude ambient atmosphere from the interior chamber;

means to agitate said material;

means to introduce an oxidizing agent into the furnace;

means to introduce an inert carrier into the furnace;

means to monitor conditions inside the furnace related to the incipient thermiting of the metal and the conditions under which agglomeration of the metal occurs, and;

means to independently control the flow into the furnace of the oxidizing agent and the carrier responsive to said monitored conditions until such time as a desired condition of said material related to conditions under which agglomeration of the metal occurs is reached, said means to control the flow of oxidizing agent and carrier being capable of simultaneously introducing the oxidizing agent and carrier inot the furnace to provide the desired proportions and total flows of the oxidizing agent and carrier in the furnace to maintain said material at said condition by controlling the proportions and the flow of oxidizing agent and carrier into the furnace in response to the monitored condition until said material is recovered.

2. An apparatus as claimed in claim 1 wherein said furnace defines a longitudinal axis and said agitating means comprises means for rotating said furnace about said axis.

3. An apparatus as claimed in claim 2 wherein said furnace comprises a chamber defining said longitudinal axis and an opening at at least one longitudinal end thereof, fixed element means supported in a fixed operating position within said opening, and closing and sealing means cooperating between said fixed elements and said chamber for closing said opening add preventing the flow of gas between the interior of the furnace and the exterior.

4. An apparatus as claimed in claim 3 wherein said introducing means comprises an oxidizing agent control valve and a carrier gas control valve and said fixed element means comprises a nozzle means for introducing said oxidizing agent and said carrier gas into the furnace.

5. An apparatus as claimed in claim 4 wherein said furnace further comprises a heat source for heating said material, responsive to conditions inside the furnace.

6. An apparatus as claimed in claim 5 wherein said heat source is selected from the group of plasma torches, oxy-fuel burners and fuel-air burners and said fixed element means further comprising said heat source.

7. An apparatus as claimed in claim 6 wherein said heat source is a fuel-air burner.

8. An apparatus as claimed in claim 7 wherein said closing and sealing means comprises a movable door means to which said fixed element means is mounted and a sealing arrangement cooperating between said door and an outer surface of said chamber.

9. An apparatus as claimed in claim 8 wherein said furnace is tiltable about a transverse axis, whereby to allow said chamber to rotate without said material substantially contacting said sealing arrangement.

10. An apparatus as claimed in claim 8 wherein said chamber includes an annular flange mounted to the exterior of the chamber in a plane transverse to the longitudinal axis, an outer surface of said flange defining a sealing face against which said sealing arrangement may in operation cooperate.

11. An apparatus as claimed in claim 10 wherein said chamber has a lip defining said chamber opening and said annular flange is axially disposed toward the other end of chamber away from said lip.

12. An apparatus as claimed in claim 7 wherein said closing and sealing means comprises a removable door means attached to said chamber and a sealing arrangement cooperating between said door and an outer surface of said fixed element means.

13. An apparatus as claimed in claim 12 wherein said furnace is tiltable about a transverse axis, whereby to allow said chamber to rotate without said material substantially contacting said sealing arrangement.

14. An apparatus as claimed in claim 5 wherein said conditions inside the furnace to be monitored include the temperature of the material to be processed and wherein the apparatus further comprises temperature measuring means located away from the interior of said furnace, said temperature measuring means being responsive to conditions inside the furnace.

15. An apparatus as claimed in claim 14 wherein said furnace exhausts to atmosphere through a flue vent and said temperature measuring means is located in said flue vent.

16. An apparatus as claimed in claim 15 wherein said control means is operable to control the operation of the oxidizing agent and inert carrier gas control valves responsive to temperatures measured by said temperature measuring means compared to a pre-determined target temperature.

17. An apparatus as claimed in claim 16 wherein said control means is also operable to control the operation of the burner responsive to temperatures measured by said temperature measuring means compared to a pre-determined other target temperature.

18. An apparatus as claimed in claim 17 further comprising pressure measuring means located within said furnace and vent damper means in said flue vent wherein said control means is operable to control the operation of the flue vent and the operation of the inert carrier gas control valve responsive to pressures measured by said pressure measuring means compared to a pre-determined target pressure.

* * * * *